(12) United States Patent
Ooya et al.

(10) Patent No.: US 6,839,431 B2
(45) Date of Patent: Jan. 4, 2005

(54) CARD CONNECTOR

(75) Inventors: Masaaki Ooya, Yokohama (JP); Kazutaka Taguchi, Asaka (JP); Minoru Igarashi, Inzai (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 490 days.

(21) Appl. No.: 10/067,404

(22) Filed: Feb. 7, 2002

(65) Prior Publication Data

US 2002/0114447 A1 Aug. 22, 2002

(30) Foreign Application Priority Data

Feb. 8, 2001 (JP) .................................. 2001-032755

(51) Int. Cl.[7] .......................... H04M 1/00; H01R 13/62
(52) U.S. Cl. .................................. 379/433.09; 439/159
(58) Field of Search ..................... 379/433.09; 439/159, 439/160, 152–158

(56) References Cited

U.S. PATENT DOCUMENTS

| | | | |
|---|---|---|---|
| 4,810,200 A | 3/1989 | Sakamoto | 439/155 |
| 4,952,161 A | 8/1990 | Komatsu | 439/155 |
| 5,033,972 A | 7/1991 | Komatsu et al. | |
| 5,051,101 A | 9/1991 | Komatsu | 439/159 |
| 5,145,389 A | 9/1992 | Okubo | |
| 5,179,505 A | 1/1993 | Matsuo | 361/395 |
| 5,197,894 A | 3/1993 | Koike | |
| 5,286,207 A | 2/1994 | McHugh | |
| 5,492,480 A | 2/1996 | Fusselman et al. | |
| 5,492,481 A | 2/1996 | Lewis | |
| 5,533,906 A | 7/1996 | Abe | |
| 5,597,316 A | 1/1997 | David et al. | 439/159 |
| 5,640,307 A | 6/1997 | Bleier et al. | 361/740 |
| 5,648,651 A | 7/1997 | Inoue | |
| 5,655,918 A | 8/1997 | Soh | |
| 5,674,080 A | 10/1997 | Takemura | |
| 5,695,351 A | 12/1997 | Kimura et al. | |
| 5,703,346 A | 12/1997 | Bricaud et al. | 235/44.1 |
| 5,725,385 A | 3/1998 | Takano et al. | |
| 5,740,012 A | 4/1998 | Choi | |

(List continued on next page.)

FOREIGN PATENT DOCUMENTS

| | | |
|---|---|---|
| JP | 3-46969 | 4/1991 |
| JP | 6-139415 | 5/1994 |
| JP | 7-192102 | 7/1995 |
| JP | 11-316110 | 11/1999 |
| JP | 2000-251024 | 9/2000 |
| JP | 2000-251025 | 9/2000 |
| JP | 2000-277207 | 10/2000 |

OTHER PUBLICATIONS

U.S. patent application Ser. No. 09/832,190, Takada et al., filed Apr. 11, 2001.
U.S. patent application Ser. No. 09/914,322, Sato, filed Aug. 27, 2001.
U.S. patent application Ser. No. 09/978,660, Sato, filed Oct. 18, 2001.

(List continued on next page.)

*Primary Examiner*—Jack Chiang
(74) *Attorney, Agent, or Firm*—Finnegan, Henderson, Farabow, Garrett & Dunner, LLP (57) ABSTRACT

In a card connector having a push-push type eject mechanism, a cam lever is retained by a cam lever retaining member made from a cantilevered leaf spring, which in turn is retained by a leaf spring formed in a metal cover. The metal cover along with the housing forms a card accommodating portion. The cam lever is therefore doubly retained by the cam lever retaining member and the leaf spring and thus prevented against coming off. This arrangement also enhances a clicking feel of the eject mechanism during the insertion and ejection of the card.

18 Claims, 12 Drawing Sheets

U.S. PATENT DOCUMENTS

| | | | |
|---|---|---|---|
| 5,871,365 | A | 2/1999 | Kajiura ........................ 439/159 |
| 5,890,920 | A | 4/1999 | David et al. |
| 5,899,763 | A | 5/1999 | Kajiura |
| 5,923,541 | A | 7/1999 | Yasumi |
| 5,967,810 | A | 10/1999 | Spickler et al. |
| 6,065,984 | A | 5/2000 | Tung |
| 6,083,018 | A | 7/2000 | Hara et al. |
| 6,095,834 | A | 8/2000 | Lai et al. |
| 6,106,313 | A | 8/2000 | Chen |
| 6,120,309 | A | 9/2000 | Hara |
| 6,139,340 | A | 10/2000 | Niitsu |
| 6,152,748 | A | 11/2000 | Sato et al. |
| 6,159,027 | A | 12/2000 | Kuo |
| 6,162,075 | A | 12/2000 | Hara et al. |
| 6,174,197 | B1 | 1/2001 | Hirata et al. |
| 6,200,148 | B1 | 3/2001 | Yu |
| 6,210,187 | B1 | 4/2001 | Tung |
| 6,227,879 | B1 | 5/2001 | Dong |
| 6,231,360 | B1 | 5/2001 | Horie |
| 6,234,813 | B1 | 5/2001 | Hanyu |
| 6,270,365 | B1 | 8/2001 | Nishioka |
| 6,273,737 | B1 | 8/2001 | Furusho et al. |
| 6,290,136 | B1 | 9/2001 | Koseki et al. |
| 6,299,465 | B1 | 10/2001 | Hirata |
| 6,302,715 | B1 | 10/2001 | Sato et al. |
| 6,319,029 | B2 | 11/2001 | Nishioka |
| 6,332,790 | B1 | 12/2001 | Ishikawa et al. |
| 6,390,836 | B1 | 5/2002 | Motegi et al. |
| 6,394,827 | B2 | 5/2002 | Nogami |
| 6,398,567 | B1 | 6/2002 | Nishimura |
| 6,398,827 | B1 | 6/2002 | Ota et al. |

OTHER PUBLICATIONS

U.S. patent application Ser. No. 09/978,661, Sato, filed Oct. 18, 2001.

U.S. patent application Ser. No. 10/090,153, Ito et al., filed Mar. 5, 2002.

U.S. patent application Ser. No. 10/102,826, Sato et al., filed Mar. 22, 2002.

U.S. patent application Ser. No. 10/102,928, Abe, filed Mar. 22, 2002.

Official Notice of Rejection for Japanese Patent Application No. 2000–319,891 dated Apr. 23, 2003 (with English translation).

CARD CONNECTOR

This application is based on patent application Ser. No. 2001-032755 filed Feb. 8, 2001 in Japan, the content of which is incorporated hereinto by reference.

BACKGROUND OF THE INVENTION

1. Field of the Invention

The present invention relates to a card connector mounted on electronic devices, such as cellular phones, telephones, PDAs (personal digital assistants), portable audio devices and cameras, and more particularly to a structure of a compact mechanism for reliably locking an IC card in the card connector.

2. Description of the Related Art

In electronic devices such as cellular phones, telephones, PDAs and cameras, a variety of functions are added by inserting an IC card with a built-in CPU or IC memory, such as a SIM (subscriber identity module) card, an MMC (multimedia card), an SD (secure digital) card, a Memory Stick (tradename) and a Smart Media (tradename).

A card connector structure for removably accommodating such an IC card has a plurality of contact terminals formed from metal leaf springs in a connector housing which are brought into contact with a plurality of contact pads formed on a front or back surface of the inserted IC card to electrically connect the IC card to the electronic device on which the connector is mounted. The contact pads of the IC card include a power supply pad connected to a power supply line and a plurality of signal pads for transferring a variety of signals. These pads are connected through the contact terminals of the card connector to the associated power supply circuit and a variety of signal processing circuits of the electronic device.

Many of the card connectors mounted on these electronic devices have an eject mechanism to eject the inserted card from the connector.

The conventional eject mechanisms are available in the following types:

One in which an insertion depth of the card is so set that the rear end of the inserted card protrudes from a card insertion opening and can be held by fingers of the user for withdrawing; and One in which an eject button provided near the card insertion opening is pressed by the user after the use of the card to activate the eject mechanism to eject the card.

In the former type, however, the card connector is required to have a dimension such that the rear end of the card protrudes from the connector for gripping by fingers. Not only does this impair the appearance of the connector but it also increases a chance of the card being damaged by external impacts and requires a large load to withdraw the card.

The latter type, on the other hand, has difficulty in locating the eject button at an appropriate position due to a limited space and also has a problem of the eject button impairing the appearance and hindering a size reduction.

Figure 12:
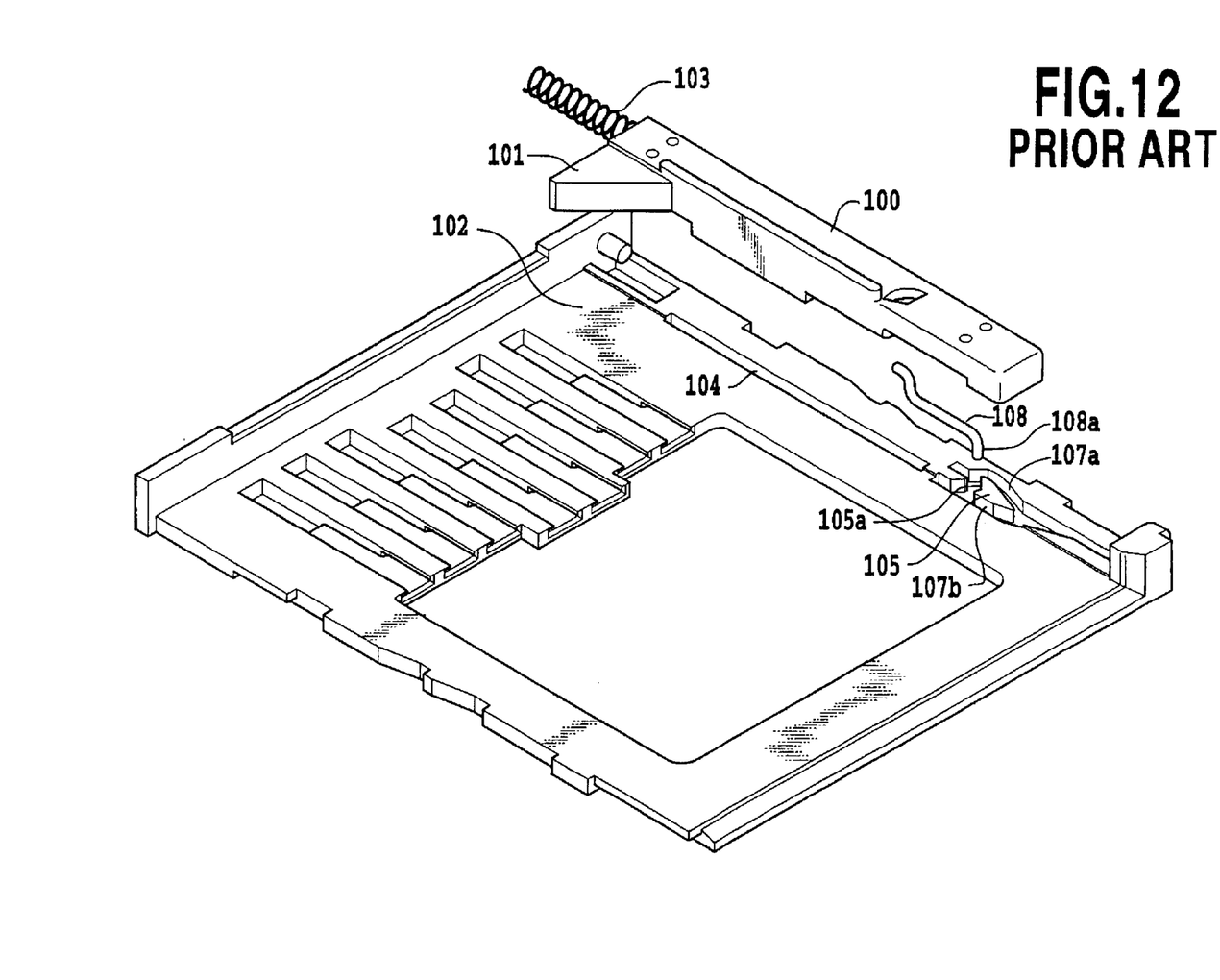
FIG. 12 is an exploded perspective view of a conventional card connector.

To solve these problems Japanese Patent Application Laid-open No. 2000-251025 has been proposed. An exploded view of the proposed structure is shown in FIG. 12. With this conventional technology, a push-push type card ejection (which activates the card eject mechanism by pushing the inserted IC card again to eject it) is realized by using a heart-shaped cam and a cam lever.

In FIG. 12, the conventional eject mechanism has an eject member 100 with a triangular card abutment portion 101 against which a triangular cut-off corner portion of the card abuts, a coil spring 103 interposed between a housing lower plate 102 and the eject member 100, a guide groove 104 formed in the housing lower plate 102 to guide the movement of the eject member 100, a heart cam 105 formed in the housing lower plate 102, lever guide grooves 107a, 107b formed in the housing lower plate 102 around the heart cam 105 to guide the movement of a cam lever 108, and the cam lever 108 having one of its end secured to the eject member 100 and the other end moving through the lever guide grooves 107.

In this eject mechanism, when a card is inserted into the connector, the eject member 100 is pushed by the card through the card abutment portion 101 and is thus moved against the force of the coil spring 103 toward the rear of the connector. At this time, a front end portion 108a of the cam lever 108 moves along the lever guide groove 107a until it is locked at a recessed locking portion 105a of the heart cam 105. Now, the card is held immovable in the connector with the contact pads of the card in contact with the contact terminals of the connector.

When the card is to be ejected, the user slightly pushes the inserted card rearward. This disengages the cam lever 108 from the locking portion 105a of the heart cam 105, allowing the front end portion 108a of the cam lever 108 to be driven forwardly of the connector along the lever guide groove 107b by the recovering force of the coil spring 103. The eject member 100 therefore moves forwardly causing the card to be ejected by the card abutment portion 101 of the eject member 100.

If the eject mechanism is provided, for example, in a side wall of the connector housing, there would be a problem that the cam lever 108 may easily come off since the end of the cam lever 108 opposite the front end portion 108a is simply press-fitted into the eject member 100.

This kind of card connector often employs a metal cover as an upper housing to reduce the thickness of the card and increase the strength of the housing. The metal cover has a ground terminal formed at one end thereof through which the metal cover is connected to a ground electrode of a printed circuit board to release a static electricity accumulated in the metal cover.

The card connector with the ground terminal formed on the metal cover has a problem that when it is desired to realize card connectors with different height (thickness) specifications or different standoff specifications, a plurality of metal covers, which are relatively large and expensive parts in the card connector, need to be prepared corresponding to these specifications (i.e., a plurality of metal covers with ground terminals of different heights must be prepared). This increases the manufacturing cost.

SUMMARY OF THE INVENTION

The present invention has been accomplished under these circumstances. It is an object of this invention to provide a card connector which reliably prevents a dislocation of the cam lever and enhances a clicking feel as the card is inserted and ejected.

Another object of the present invention is to provide a card connector which, when a stand-off specification changes, realizes a ground connection simply by modifying a small and inexpensive part to reduce the manufacturing cost.

According to one aspect of the present invention there is provided a card connector comprising: a connector housing having a plurality of contact terminals arranged therein; a metal cover covering the connector housing to form a card accommodating portion, the card accommodating portion being adapted to hold a card therein in such a way that a plurality of contact pads formed at a bottom of the card engage the contact terminals; an eject member having a heart-shaped cam element and grooves formed around the cam element, the eject member being adapted to move in a card insertion direction with respect to the connector housing as the card is inserted into the card accommodating portion and to move in a card ejection direction with respect to the connector housing in response to a card eject operation; a cam lever having one of its ends pivotally supported in the connector housing and the other end adapted to slide in the grooves around the cam element; a cam lever retaining member secured to the connector housing to bear on the cam lever; and a leaf spring formed in the metal cover to bear on the cam lever retaining member.

In this invention, the cam lever is retained by a cam lever retaining member made from a cantilevered leaf spring, which in turn is retained by a leaf spring formed in a metal cover. The cam lever is therefore doubly retained by the cam lever retaining member and the leaf spring. This arrangement reliably prevents a dislocation of the cam lever and enhances a clicking feel as the card is inserted and ejected.

In a preferred embodiment of this invention, the cam lever retaining member is formed from a conductive member and is grounded to a printed circuit board through its terminal end portion.

In a preferred embodiment of this invention, the conductive cam lever retaining member contacts the leaf spring formed in the metal cover, with its terminal end portion grounded to the printed circuit board. Therefore, static electricity that has built up in the metal cover can be released to a ground electrode through the cam lever retaining member. In this invention, because the connector is grounded to the printed circuit board through the terminal end portion of the cam lever retaining member, a variety of stand-off specifications can be dealt with simply by changing the length of the terminal end portion of the cam lever according to each of the stand-off specifications. The cam lever retaining member is small and inexpensive compared with the metal cover, so that the manufacturing cost of the card connector can be minimized in dealing with a variety of stand-off specifications.

According to another aspect of the present invention, there is provides a card connector comprising: a connector housing having a plurality of contact terminals arranged therein, the connector housing also having a heart-shaped cam element and grooves formed around the cam element; a metal cover covering the connector housing to form a card accommodating portion, the card accommodating portion being adapted to hold a card therein in such a way that a plurality of contact pads formed at a bottom of the card contact the contact terminals; an eject member adapted to move in a card insertion direction with respect to the connector housing as the card is inserted into the card accommodating portion and to move in a card ejection direction with respect to the connector housing in response to a card eject operation; a cam lever having one of its ends pivotally supported in the eject member and the other end adapted to slide in the grooves around the cam element; a cam lever retaining member secured to the connector housing to bear on the cam lever; and a leaf spring formed in the metal cover to bear on the cam lever retaining member.

In this another aspect of the present invention, the heart-shaped cam element is formed in the connector housing and the cam lever is pivotally supported at one end on the eject member and, at the other end, is slid around the cam element.

In this another aspect of the invention, too, the cam lever is retained by a cam lever retaining member made from a cantilevered leaf spring, which in turn is retained by a leaf spring formed in a metal cover. The cam lever is therefore doubly retained by the cam lever retaining member and the leaf spring. This arrangement reliably prevents a dislocation of the cam lever and enhances a clicking feel as the card is inserted and ejected.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now, embodiments of the present invention will be described in detail by referring to the accompanying drawings.

Figure 1A:
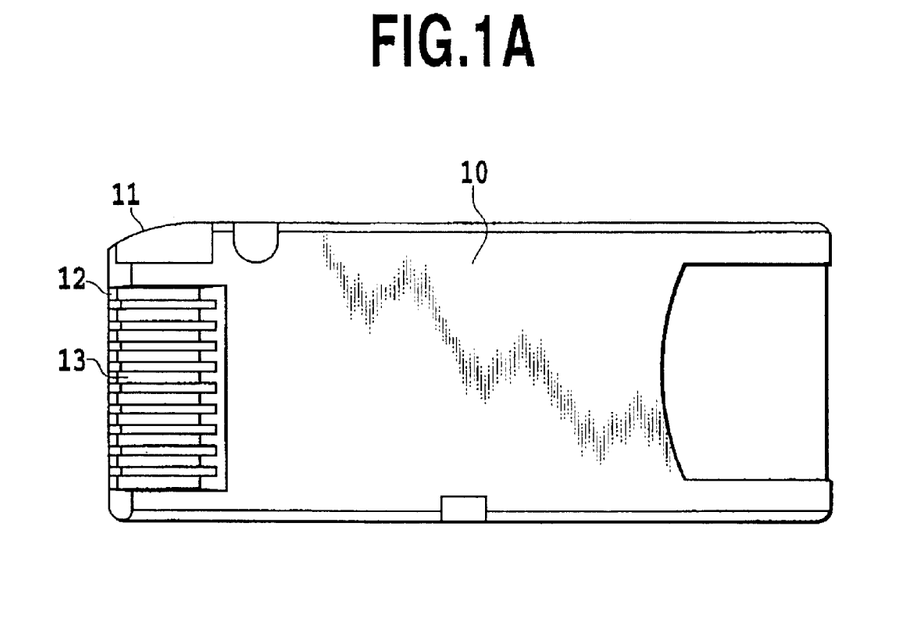
FIG. 1A and FIG. 1B are a plan view and a side view of an example of an IC card.
Figure 1B:
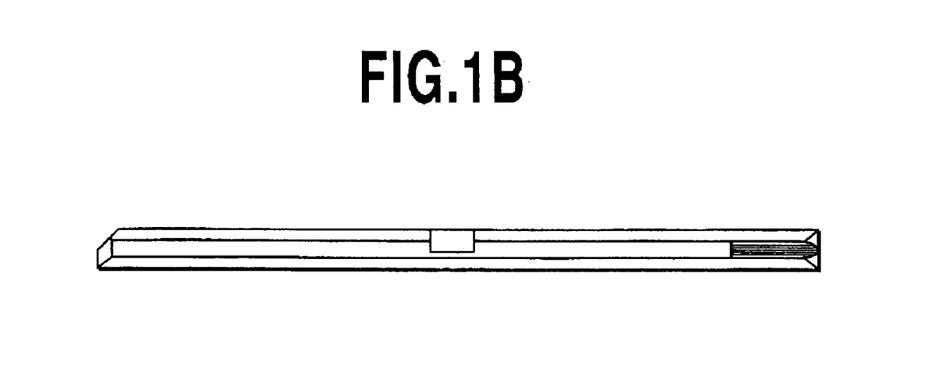

FIG. 1 shows a Memory Stick (tradename) as an example of an IC card 10 with FIG. 1A showing a contact pad surface of the card and FIG. 1B a side surface of the card.

The IC card 10 has a cut-off corner portion 11 at one front corner to prevent its erroneous insertion. The card body 10 is formed in its front area with a plurality of recesses 12, at the bottoms of which are arranged contact pads 13 that are connected to an internal memory circuit or control circuit of the card. The contact pads 13 are formed in a 10-pin configuration.

In the embodiment that follows, we will describe the present invention as applied to a connector for the IC card 10 described above by referring to FIG. 2 to FIG. 9.

Figure 2:
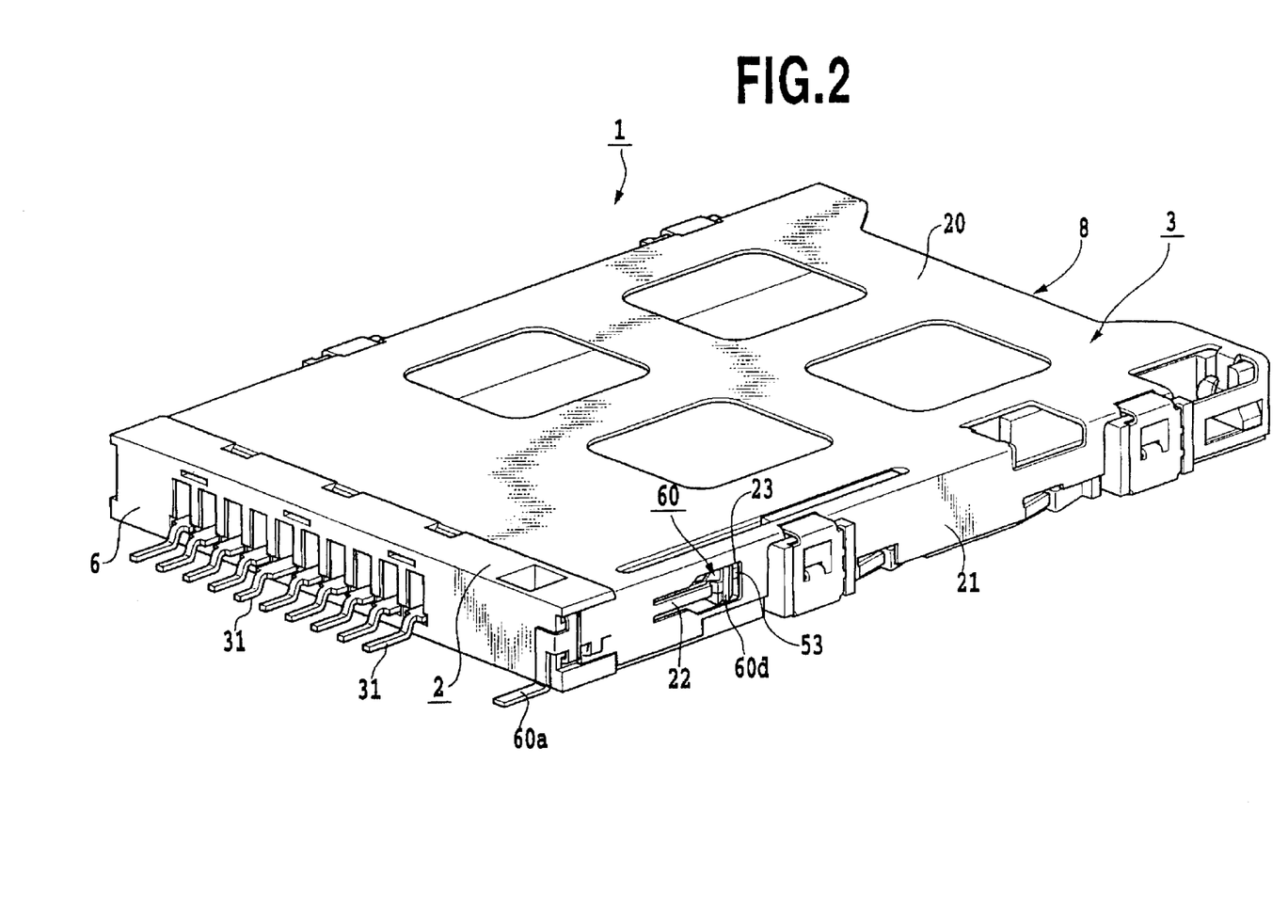
FIG. 2 is a perspective view showing an external construction of one embodiment of a card connector according to the present invention.
Figure 3:
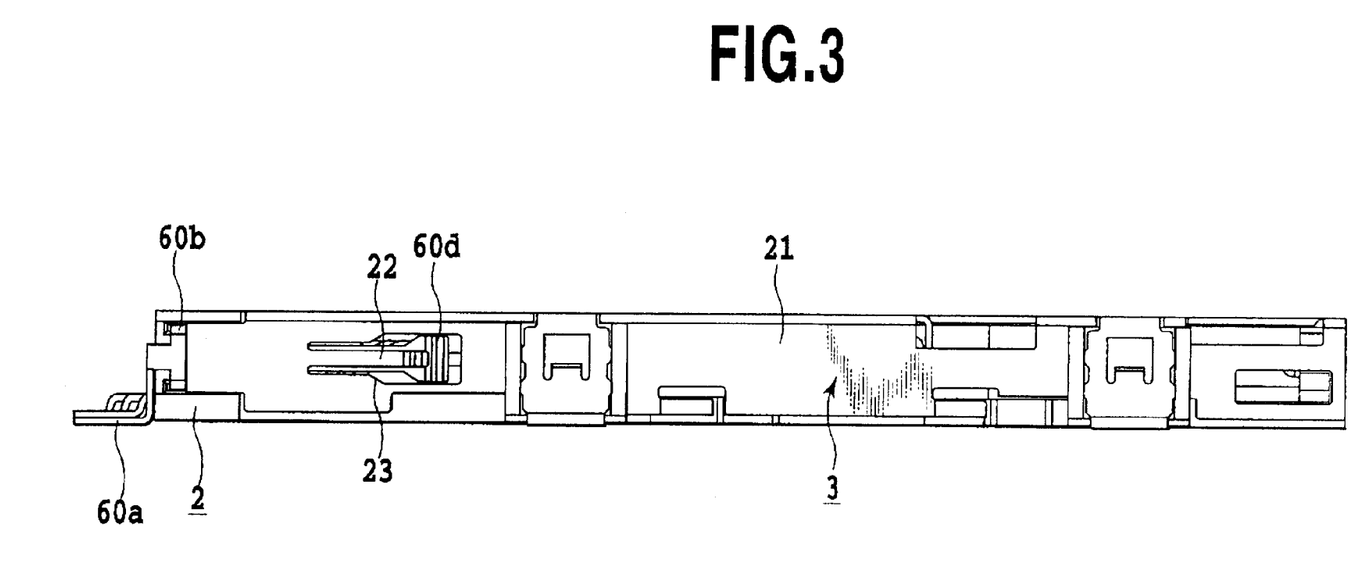
FIG. 3 is a side view of FIG. 2.
Figure 4:
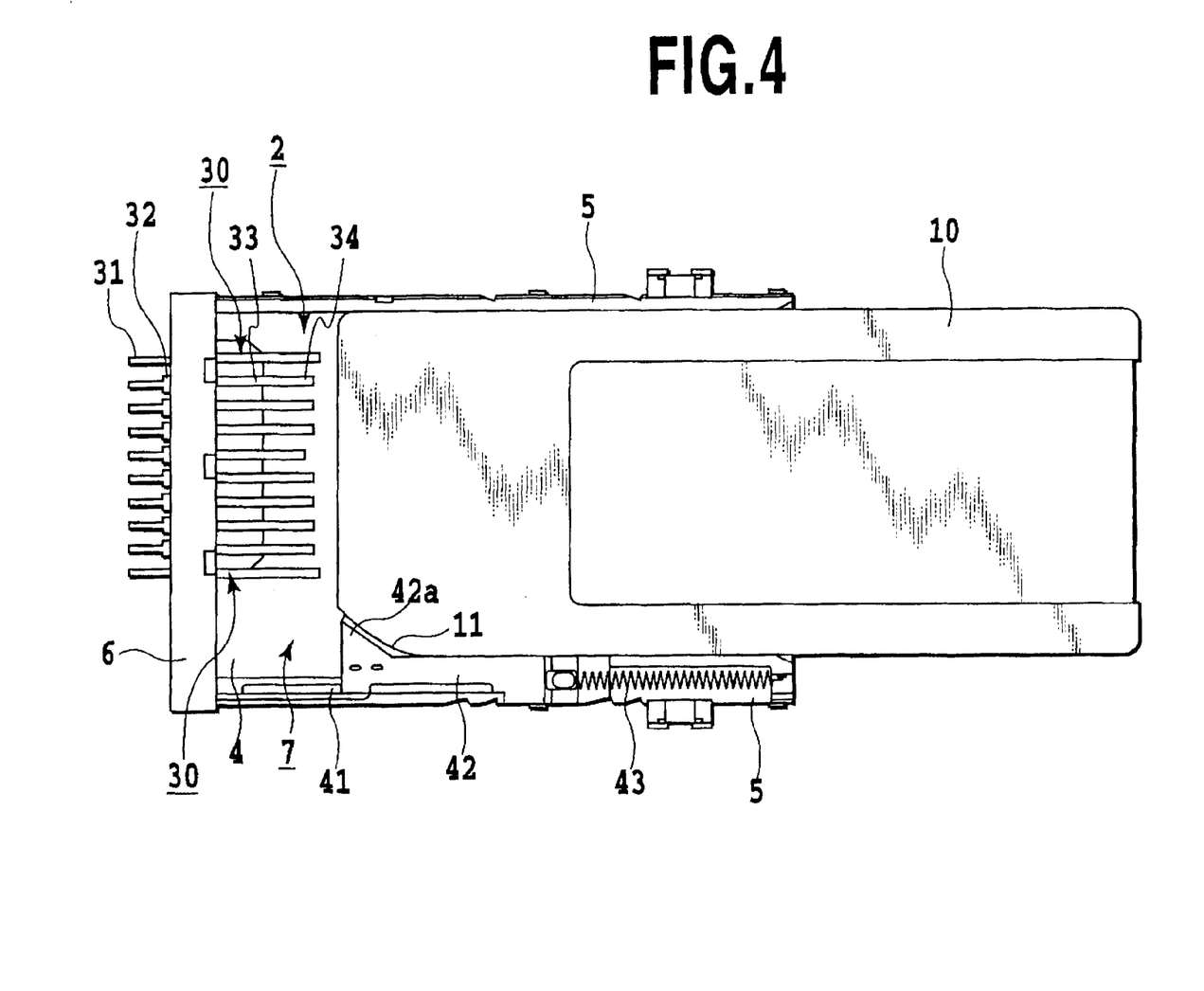
FIG. 4 is a plan view showing an internal structure of the card connector according to the invention.
Figure 5:
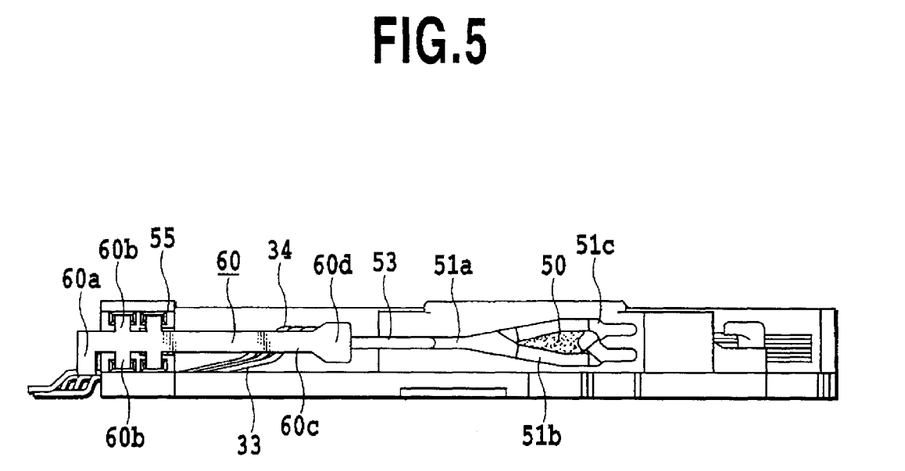
FIG. 5 is a side view of the card connector of FIG. 2 with a metal cover being omitted.
Figure 6:
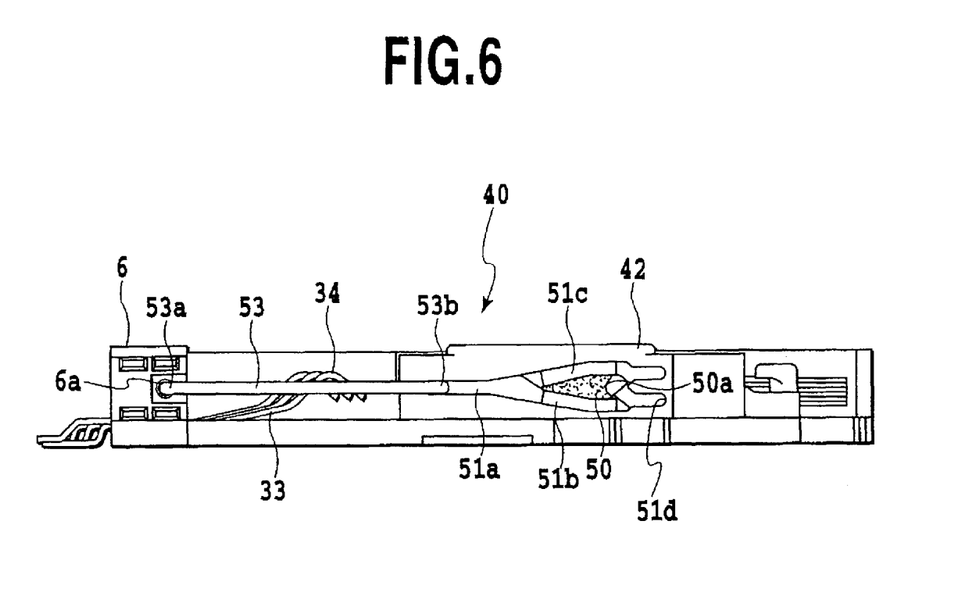
FIG. 6 is a side view of the card connector of FIG. 2 in a card ejected state with the metal cover and a cam lever retainer being omitted.
Figure 7:
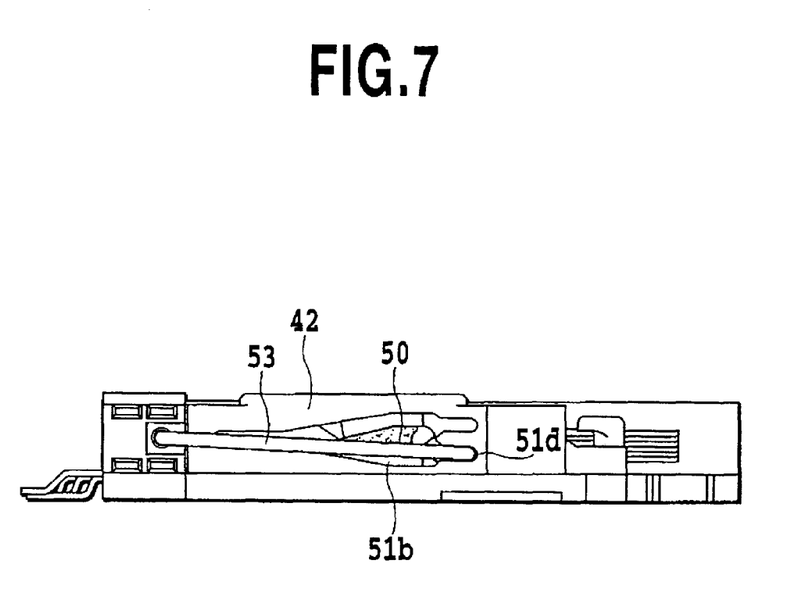
FIG. 7 is a side view of the card connector of FIG. 2 immediately before the card is locked, with the metal cover and the cam lever retainer being omitted.
Figure 8:
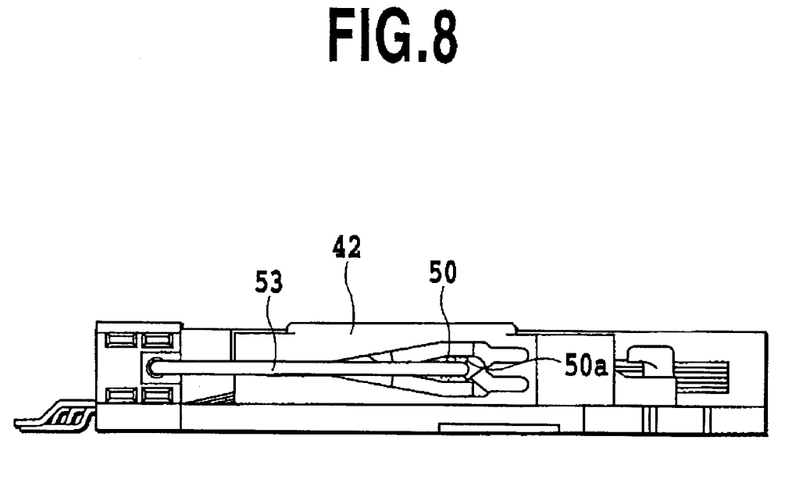
FIG. 8 is a side view of the card connector of FIG. 2 in a card locked state, with the metal cover and the cam lever retainer being omitted.
Figure 9:
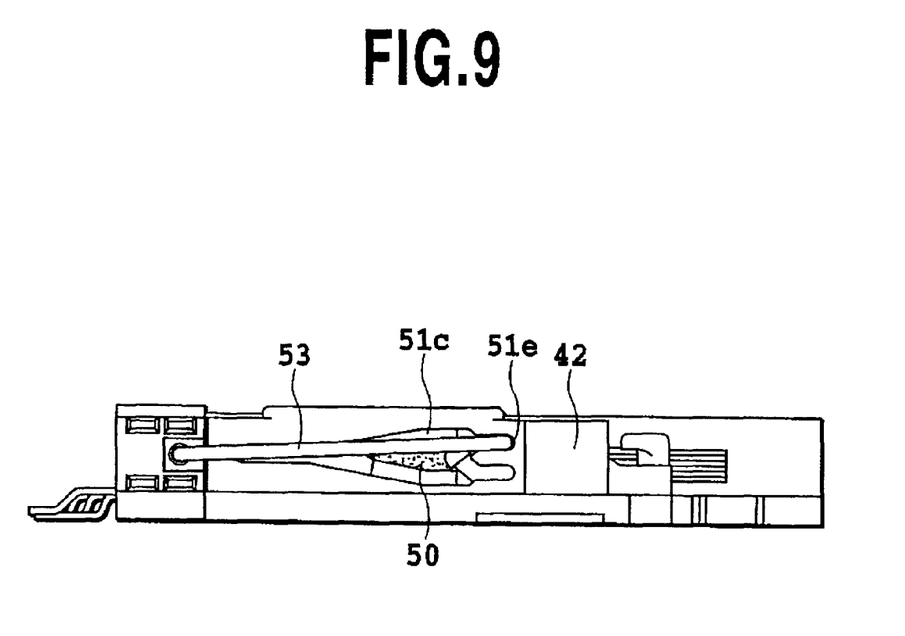
FIG. 9 is a side view of the card connector of FIG. 2 immediately after the card is unlocked, with the metal cover and the cam lever retainer being omitted.

FIG. 2 is a perspective view showing an external construction of the card connector 1. FIG. 3 is a side view of the card connector. FIG. 4 is a plan view showing an inner construction of the card connector 1 with the metal cover removed. FIG. 5 is a side view of FIG. 4. FIG. 6 illustrates the eject mechanism in a card ejected state. FIG. 7 shows the state of the eject mechanism when the card is pushed for loading. FIG. 8 shows the state of the eject mechanism when the card is completely loaded. FIG. 9 shows the state of the eject mechanism when the card is pushed for withdrawing.

The card connector 1 is mounted on electronic devices, such as cellular phones, PDAs, portable audio devices, cameras and so on. The card 10 is inserted into the connector 1 with its contact pad surface facing down.

The card connector 1 has a lower housing 2 and a metal cover 3 as an upper housing. The lower housing 2 is formed of an insulating material such as resin. The upper housing 3 is formed from a metal plate through sheet metal processing and functions as a cover body covering the lower housing 2. The reason that the upper housing 3 is formed from a sheet metal, not from resin, is that metal is stronger than resin and thus can reduce the height of the connector.

The metal cover 3 comprises mainly an almost flat top plate 20 and left and right side plates 21 bent at right angle to the top plate 20. One of the side plates 21 of the metal cover 3 is formed with a leaf spring 22 in a window 23 as by blanking. The leaf spring 22 constitutes an important part of this invention and thus will be detailed later.

The lower housing 2, as shown in FIG. 4 and so on, has a bottom plate 4, left and right side plates 5 rising from opposite sides of the bottom plate 4, and a rear plate 6 situated at the rear ends of the bottom plate 4 and the side plates 5. The side plates 21 of the metal cover 3 engage with the side plates 5 of the lower housing 2. In this state the top plate 20 of the metal cover 3 and the bottom plate 4, side plates 5 and rear plate 6 of the lower housing 2 combine to form an almost rectangular card accommodating portion 7 in which the card 10 is loaded. The card 10 is inserted from a card insertion opening 8 (FIG. 2) formed at the front of the upper and lower housings.

Inner walls of the left and right side plates 5 of the lower housing 2 are formed with guide rails (not shown) that guide side edges of the card 10. The card 10 is inserted or withdrawn along the guide rails with its contact pad surface facing down.

A plurality (in this case, 10) of contact terminals 30 are securely press-fitted into the bottom plate 4 of the lower housing 2.

Each of the contact terminals 30, as shown in FIG. 2 and FIGS. 4 to 6, is formed from a cantilevered metal leaf spring and has a terminal portion 31 to be soldered to an associated contact pad on a printed circuit board of the electronic device, a fixed portion 32 press-fitted into the bottom plate 4 of the lower housing 2, and an elastically displaceable spring portion 33. The spring portion 33 has at its front end an arc-shaped contact portion 34 that protrudes upwardly to come into contact with the contact pads 13 of the IC card 10.

The card connector 1 has a so-called push-push type eject mechanism 40 in which the inserted card 10 is ejected forwardly by slightly pushing it rearwardly, i.e., to the far side, of the housing.

The eject mechanism 40, as shown in FIG. 4 to FIG. 9, includes an eject member 42 which is movable longitudinally of the lower housing 2 along a guide groove 41 formed in the bottom plate 4 of the lower housing 2. The eject member 42 has a heart-shaped cam element (heart cam) 50 formed in an outer side wall thereof and also lever guide grooves 51a–51c formed around the heart cam 50. The eject mechanism 40 also includes a staple-shaped cam lever 53 having its one end 53a supported in the lower housing 2 and the other end 53b adapted to slide along the lever guide grooves 51a–51c, and a coil spring 43 (FIG. 4) interposed between the lower housing 2 (or metal cover 3) and the eject member 42.

The eject member 42 has a card abutment portion 42a that abuts the cut-off corner portion 11 of the card 10.

One end 53a of the cam lever 53 is inserted in and rotatably supported by a hole 6a (FIG. 6) formed in a side surface of the rear plate 6 of the lower housing 2. The other end 53b of the cam lever 53 is guided and slid along the lever guide grooves 51a–51c formed around the heart cam 50.

Since one end 53a of the cam lever 53 is simply inserted in the hole 6a formed in the lower housing 2, a cam lever retaining member 60 is provided which holds the cam lever 53 from outside to prevent it from coming off and ensure a smooth sliding movement of the cam lever end 53b in the lever guide grooves 51a–51c.

In this case, the cam lever retaining member 60 is formed from a metal leaf spring and has a terminal end portion 60a to be connected to a ground electrode pad of the printed circuit board, a plurality of press fit portions 60b press-fitted in the lower housing 2, and an elastically displaceable spring portion 60c. The press fit portions 60b of the cam lever retaining member 60 are fitted under pressure into a plurality (in this case, four) of slots 55 formed in the side surface of the rear plate 6 of the lower housing 2 on both sides of the hole 6a so that the cam lever retaining member 60 is supported like a cantilever. The spring portion 60c has at its free end an arc-shaped lever engagement portion 60d that protrudes toward the cam lever 53.

Since the cam lever retaining member 60 is elastically deformed by the sideways displacement of the cam lever 53 as the eject member 42 is moved, the side plate 21 of the metal cover 3 is formed with the window 23 set forth above to provide a clearance for the elastic deformation of the cam lever retaining member 60.

In the window 23 of the metal cover 3 the leaf spring 22 is formed integral with the metal cover 3 by blanking to further bear on the cam lever retaining member 60 from outside. The leaf spring 22 is formed in the side plate 21 of the metal cover 3 to extend along the spring portion 60c of the cam lever retaining member 60. The leaf spring 22 is urged toward the cam lever retaining member 60 to press on it from outside.

In this eject mechanism 40 of the card connector 1, before the card is inserted or when the card eject operation is completed, the eject member 42 is located at a predetermined position on the front side of the housing by the pulling force of the coil spring 43, as shown in FIG. 6. At this time, the front end 53b of the cam lever 53 is situated in the lever guide groove 51a of the eject member 42.

When in this state the card 10 is inserted into the card connector 1, the eject member 42 is pushed by the card through the card abutment portion 42a. The eject member 42 is thus moved rearwardly of the connector against the force of the coil spring 43. At this time, the front end 53b of the cam lever 53 moves along the lever guide groove 51b until it finally abuts a groove end 51d on the lever guide groove 51b side, as shown in FIG. 7.

In this state, when the user stops pushing the card and releases it, the recovering force of the coil spring 43 moves the eject member 42 forwardly of the connector, causing the front end 53b of the cam lever 53 to engage a recessed engagement portion 50a of the heart cam 50 and become locked by it, as shown in FIG. 8. Thus, the card 10 is held immovable with its contact pads 13 in contact with the contact terminals 30 of the connector.

When the card 10 is to be ejected, the inserted card 10 is pushed slightly rearwardly or to the far side. As a result, the eject member 42 moves rearwardly of the connector, unlocking the cam lever 53 from the engagement portion 50a of the heart cam 50 and bringing the front end 53b of the cam lever 53 into abutment with a groove end 51e on a lever guide groove 51c side, as shown in FIG. 9.

In this state, when the user stops pushing and releases the card, the recovering force of the coil spring 43 moves the eject member 42 to the front side of the connector. As a result, the front end 53b of the cam lever 53 moves along the lever guide groove 51c until it finally returns to the original state of FIG. 6.

In this way, the card 10 is ejected by the card abutment portion 42a of the eject member 42.

In this embodiment, the cam lever 53 is held from outside by the cam lever retaining member 60 formed from a cantilevered leaf spring, and the cam lever retaining member 60 is in turn held from outside by the leaf spring 22 which is formed in the metal cover 3. That is, the cam lever 53 is retained doubly by the cam lever retaining member 60 and the leaf spring 22. This arrangement, therefore, can not only reliably prevent the staple-shaped cam lever from getting dislocated but also enhance a clicking feel of the eject mechanism 40 during the card insertion/ejection process.

In this embodiment, the cam lever retaining member 60 of a conductive material (for example, metal) is formed with the terminal end portion 60a through which it can be grounded to the printed circuit board. The cam lever retaining member 60 contacts the leaf spring 22 formed in the metal cover 3. Thus, static electricity accumulated in the metal cover 3 can be released to the ground electrode through the leaf spring 22 and the cam lever retaining member 60. It is therefore not necessary to form a ground terminal in the metal cover 3 as in the conventional connector.

As described above, in this embodiment, because the terminal end portion 60a of the cam lever retaining member 60 accomplishes the grounding of the metal cover 3 to the printed circuit board, if the number of variations of the connector housing standoff specification increases, this can be dealt with by simply changing the length of the terminal end portion 60a of the cam lever retaining member 60 according to each of the stand-off specifications. The cam lever retaining member 60 is small and inexpensive compared with the metal cover 3, so that the manufacturing cost of the card connector can be minimized when meeting the requirements of a variety of stand-off specifications.

Figure 10:
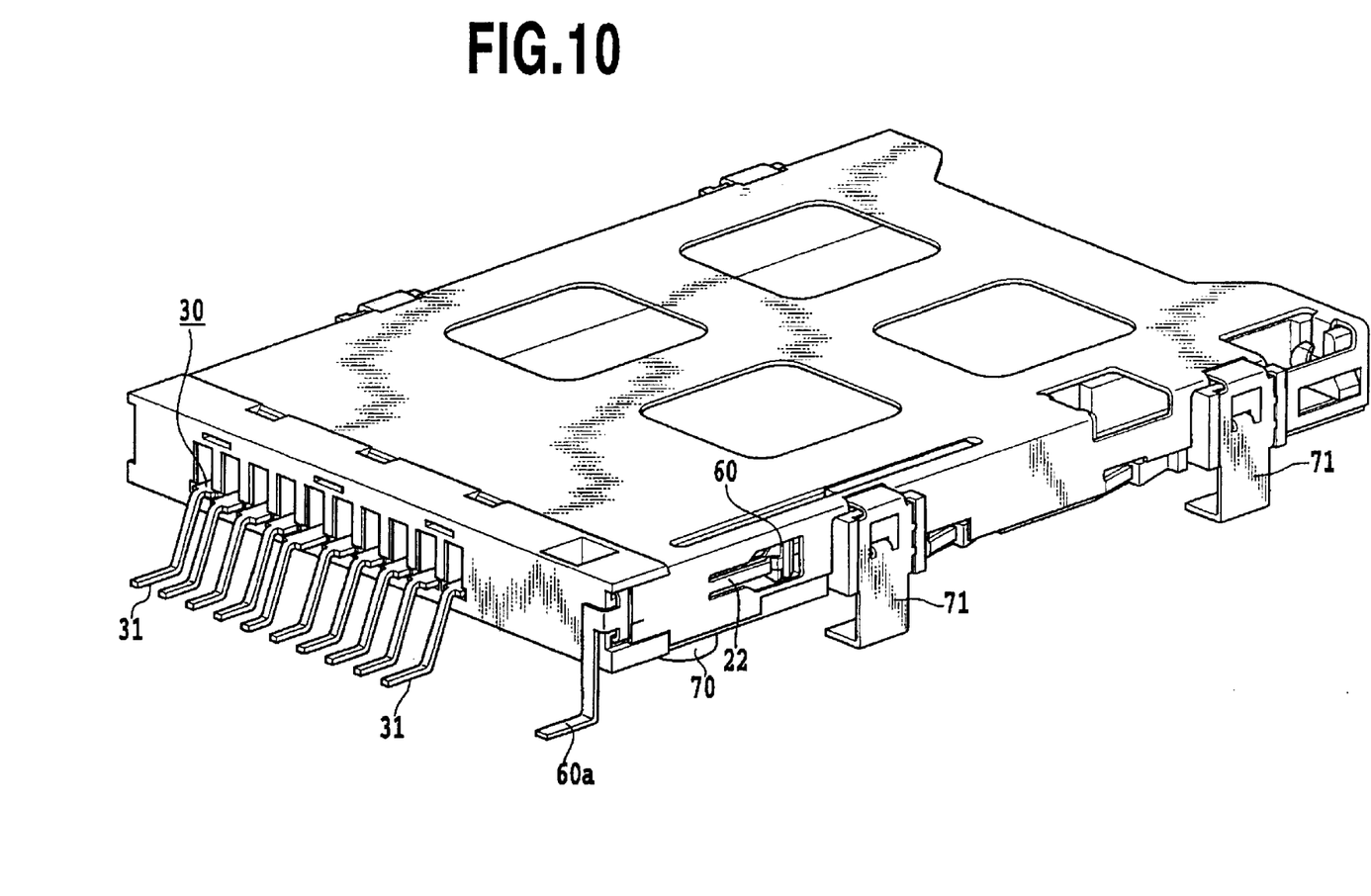
FIG. 10 is a perspective view showing an external construction of another embodiment of the card connector according to the present invention.
Figure 11:
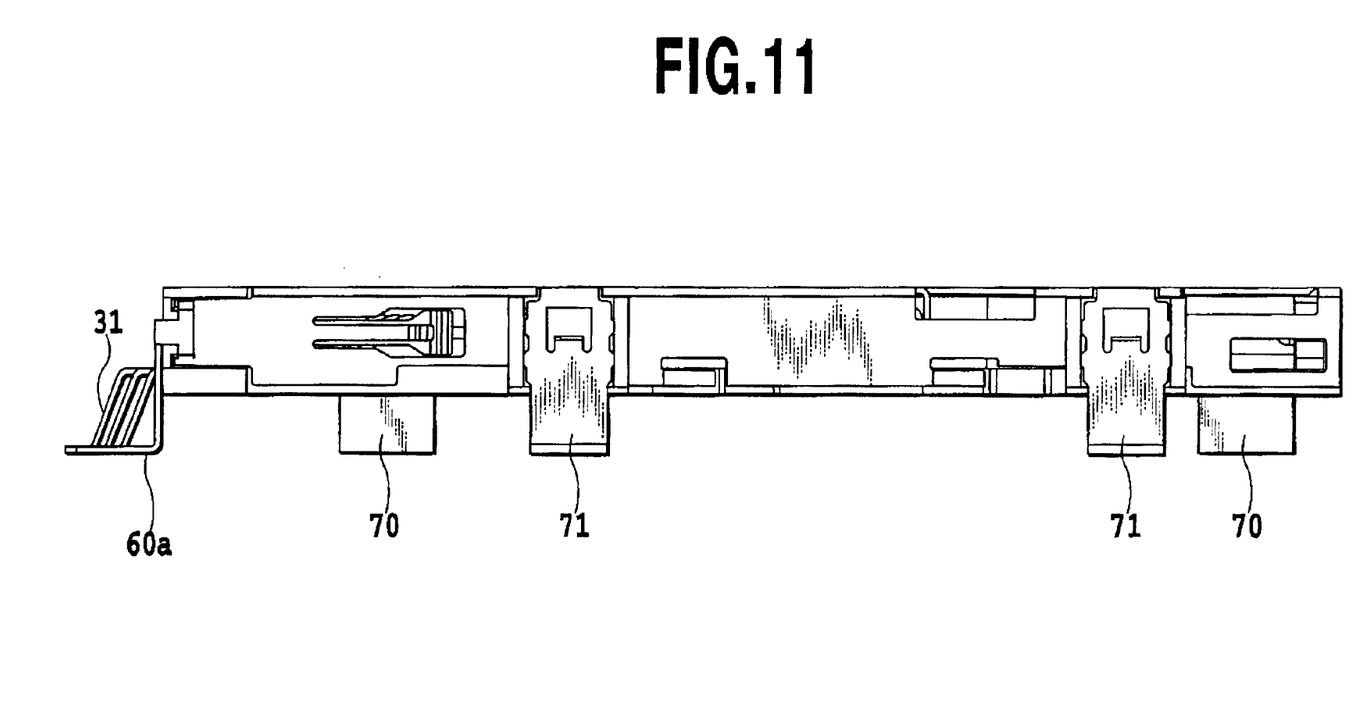
FIG. 11 is a side view of FIG. 10.

FIG. 10 and FIG. 11 show a card connector with a different stand-off specification from that of the previous embodiment. In FIG. 10 and FIG. 11, the lower housing 2 has a plurality of legs 70, which increase the stand-off distance from the lower housing 2 to the printed circuit board. According to the increased stand-off distance, metal fixtures 71 for fixing the card connector 1 to the printed circuit board are set high.

If the stand-off specification varies among the connectors, the metal cover 3 used in the embodiment shown in FIG. 2 to FIG. 9 can be used commonly. That is, only by elongating the stand-off lengths of the terminal portions 31 of the contact terminals 30 and the stand-off length of the terminal end portion 60a of the cam lever retaining member 60, it is possible to connect the contact terminals and the ground terminal of the card connector to the printed circuit board.

[Variations of Embodiment]

Although, in the embodiment above, the heart cam 50 is provided on the eject member 42 side and a pivoting fulcrum 53a of the cam lever 53 is set on the lower housing 2 side, the present invention is also applicable to an eject mechanism in which, as in the prior art shown in FIG. 12, the heart cam is provided on the connector housing side and the pivoting fulcrum 53a of the cam lever 53 on the eject member 42 side.

While in the embodiment above the heart cam 50, the cam lever 53 and the cam lever retaining member 60 are provided on the side surface of the connector, it is also possible in this invention to provide them on the top surface or bottom surface of the connector.

Further, it should be noted that the eject mechanism shown in the embodiment above represents only one example and other eject mechanisms of arbitrary constructions may be adopted. The present invention is also applicable to a construction in which the eject operation is initiated by an eject button.

Further, while in the embodiment above the Memory Stick (tradename) is used as the IC card 10, this invention can also be applied to other kinds of card, such as SIM card, MMC and SD card.

The present invention may also employ any other shape and material for the connector housing.

As described above, since the cam lever of the eject mechanism is held from outside by the cam lever retaining member which in turn is held from outside by the leaf spring formed in the metal cover, the cam lever is doubly retained by the cam lever retaining member and the leaf spring. This arrangement can not only reliably prevent a possible dislocation of the cam lever but also enhance a clicking feel of the eject mechanism as the card is inserted or ejected.

Further, in this invention, because the metal cover of the card connector is grounded to the printed circuit board through the cam lever retaining member, the static electricity that has built up in the metal cover can be discharged to ground through the cam lever retaining member. Hence, if the number of variations of the connector housing stand-off specification increases, the construction described above allows the metal cover to be used commonly and only requires preparing the cam lever retaining members, which are small and inexpensive parts, according to a variety of the stand-off specifications. The manufacturing cost of the card connectors therefore can be minimized when dealing with a variety of stand-off specifications.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A card connector comprising:
   a connector housing having a plurality of contact terminals arranged therein;
   a metal cover covering the connector housing to form a card accommodating portion, the card accommodating portion being adapted to hold a card therein in such a way that a plurality of contact pads formed at a bottom of the card contact the contact terminals;

an eject member having a heart-shaped cam element and grooves formed around the cam element, the eject member being adapted to move in a card insertion direction with respect to the connector housing as the card is inserted into the card accommodating portion and to move in a card ejection direction with respect to the connector housing in response to a card eject operation;

a cam lever having one of its ends pivotally supported in the connector housing and the other end adapted to slide in said grooves around the cam element;

a cam lever retaining member secured to said connector housing to bear on the cam lever; and a leaf spring formed in said metal cover to bear on said cam lever retaining member.

2. A card connector as claimed in claim 1, wherein the cam lever is a staple-shaped and has one of its ends pivotally supported in a hole formed in a side surface of said connector housing.

3. A card connector as claimed in claim 1, wherein said cam element and said grooves around the cam element are formed in a side surface of said eject member, and said cam lever retaining member is a cantilevered leaf spring with one of its ends secured to a side surface of said connector housing.

4. A card connector as claimed in claim 2, wherein said cam element and said grooves around the cam element are formed in a side surface of said eject member, and said cam lever retaining member is a cantilevered leaf spring with one of its ends secured to a side surface of said connector housing.

5. A card connector as claimed in claim 1, wherein said cam lever retaining member is formed from a conductive member and has a terminal end portion that can be grounded to a printed circuit board.

6. A card connector as claimed in claim 2, wherein said cam lever retaining member is formed from a conductive member and has a terminal end portion that can be grounded to a printed circuit board.

7. A card connector as claimed in claim 3, wherein said cam lever retaining member is formed from a conductive member and has a terminal end portion that can be grounded to a printed circuit board.

8. A card connector as claimed in claim 4, wherein said cam lever retaining member is formed from a conductive member and has a terminal end portion that can be grounded to a printed circuit board.

9. A card connector as claimed in claim 1, wherein an elastic body for moving the eject member in the card ejection direction is interposed between the eject member and the connector housing or metal cover.

10. A card connector comprising:

a connector housing having a plurality of contact terminals arranged therein, the connector housing also having a heart-shaped cam element and grooves formed around the cam element;

a metal cover covering the connector housing to form a card accommodating portion, the card accommodating portion being adapted to hold a card therein in such a way that a plurality of contact pads formed at a bottom of the card contact the contact terminals;

an eject member adapted to move in a card insertion direction with respect to the connector housing as the card is inserted into the card accommodating portion and to move in a card ejection direction with respect to the connector housing in response to a card eject operation;

a cam lever having one of its ends pivotally supported in the eject member and the other end adapted to slide in said grooves around the cam element;

a cam lever retaining member secured to said connector housing to bear on said cam lever; and a leaf spring formed in said metal cover to bear on said cam lever retaining member.

11. A card connector as claimed in claim 10, wherein the cam lever is a staple-shaped and has one of its ends pivotally supported in a hole formed in a side surface of said eject member.

12. A card connector as claimed in claim 10, wherein the cam element and the grooves around the cam element are formed in a side surface of the connector housing, and the cam lever retaining member is a cantilevered leaf spring with one of its ends secured to a side surface of the connector housing.

13. A card connector as claimed in claim 11, wherein the cam element and the grooves around the cam element are formed in a side surface of the connector housing, and the cam lever retaining member is a cantilevered leaf spring with one of its ends secured to a side surface of the connector housing.

14. A card connector as claimed in claim 10, wherein the cam lever retaining member is formed from a conductive member and has a terminal end portion that can be grounded to a printed circuit board.

15. A card connector as claimed in claim 11, wherein the cam lever retaining member is formed from a conductive member and has a terminal end portion that can be grounded to a printed circuit board.

16. A card connector as claimed in claim 12, wherein the cam lever retaining member is formed from a conductive member and has a terminal end portion that can be grounded to a printed circuit board.

17. A card connector as claimed in claim 13, wherein the cam lever retaining member is formed from a conductive member and has a terminal end portion that can be grounded to a printed circuit board.

18. A card connector as claimed in claim 10, wherein an elastic body for moving the eject member in the card ejection direction is interposed between the eject member and the connector housing or metal cover.

* * * * *